US009489357B2

(12) United States Patent
Skutela et al.

(10) Patent No.: US 9,489,357 B2
(45) Date of Patent: Nov. 8, 2016

(54) DATA PROCESSING SYSTEM

(71) Applicant: SAP SE, Walldorf (DE)

(72) Inventors: Ariane Skutela, Karlsruhe (DE); Dirk Ahlert, Muehlhausen (DE); Christian Guenther, Mannheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/932,954

(22) Filed: Jul. 1, 2013

(65) Prior Publication Data

US 2013/0290833 A1 Oct. 31, 2013

Related U.S. Application Data

(63) Continuation of application No. 10/557,846, filed as application No. PCT/EP2004/005671 on May 26, 2004, now Pat. No. 8,478,840.

(60) Provisional application No. 60/478,463, filed on Jun. 13, 2003.

(51) Int. Cl.
| | |
|---|---|
| G06F 15/16 | (2006.01) |
| G06F 17/22 | (2006.01) |
| G06Q 10/06 | (2012.01) |
| G06Q 10/08 | (2012.01) |
| G06Q 10/10 | (2012.01) |
| G07C 1/10 | (2006.01) |
| G07C 9/00 | (2006.01) |
| H04L 29/08 | (2006.01) |

(52) U.S. Cl.
CPC ........... *G06F 17/2247* (2013.01); *G06Q 10/06* (2013.01); *G06Q 10/087* (2013.01); *G06Q 10/10* (2013.01); *G07C 9/00103* (2013.01); *G07C 1/10* (2013.01); *G07C 9/00007* (2013.01); *H04L 67/02* (2013.01); *H04L 67/306* (2013.01)

(58) Field of Classification Search
CPC .... G06F 17/2247; G06Q 10/06; G06Q 10/087; G06Q 10/10; G07C 9/00103; G07C 1/10; G07C 9/00007; H04L 67/306; H04L 67/02
See application file for complete search history.

(56) References Cited

U.S. PATENT DOCUMENTS

| | | | |
|---|---|---|---|
| 5,491,471 A | 2/1996 | Stobbe | |
| 6,344,794 B1 * | 2/2002 | Ulrich et al. | ............ 340/539.16 |
| 6,693,539 B2 | 2/2004 | Bowers et al. | |
| 2002/0143898 A1 | 10/2002 | Mansfield et al. | |
| 2002/0149616 A1 | 10/2002 | Gross et al. | |
| 2002/0186121 A1 | 12/2002 | Yoshikawa et al. | |
| 2003/0233287 A1 * | 12/2003 | Sadler et al. | .................... 705/28 |
| 2004/0010571 A1 * | 1/2004 | Hutchinson et al. | ......... 709/220 |
| 2004/0024644 A1 * | 2/2004 | Gui et al. | ........................ 705/22 |
| 2004/0024660 A1 | 2/2004 | Ganesh et al. | |
| 2004/0215544 A1 * | 10/2004 | Formale | ................. G06Q 10/10 705/36 R |

OTHER PUBLICATIONS

Noah, The Integration of the World Wide Web and Intranet Data Resources, Proceedings of the Thirty-First Hawaii International Conference on System Sciences, Kohala Coast, HI, USA, IEEE, Comput. Soc., US, pp. 496-502 (Jan. 6, 1998).

* cited by examiner

*Primary Examiner* — Cheikh Ndiaye

(57) ABSTRACT

The present invention provides for a server computer, a data processing system and an access control system. Data related to items that are supposed to be in the possession of an employee is retrieved from distributed data sources. A web page is generated using these data values for the employee's information and review. These data values can be stored on a chip card that is used for access control and/or control of the circulation of items within the premises of a company.

6 Claims, 7 Drawing Sheets

| Item Name | Item Value | Item Location | Item ID | Service Request Address |
|---|---|---|---|---|
| | | | | |
| | | | | |
| | | | | |
| | | | | |
| | | | | |

DATA PROCESSING SYSTEM

CROSS-REFERENCE TO RELATED APPLICATIONS

This is a continuation of U.S. application Ser. No. 10/557,846, filed Nov. 21, 2005 (now allowed), which claims priority to and benefit from International Application No. PCT/EP04/05671, filed May 26, 2004, which claims the benefit of U.S. Provisional Application No. 60/478,463, filed Jun. 13, 2003, all of which are expressly incorporated herein by reference in their entireties.

FIELD OF THE INVENTION

The present invention relates to the field of data processing for providing and maintaining user specific information, and more particularly without limitation to access control systems.

BACKGROUND AND PRIOR ART

Various organisations in the fields of business and administration face an enormous task of maintaining and controlling large inventories of items that are required by their employees to perform their respective duties. To facilitate check-in/check-out, inventorying, and theft control of such items it is known to use bar codes and/or sensitisable magnetic strips. The bar codes allow the items to be quickly identified using a scanner. The magnetic strip is used in conjunction with a magnetic detection device for theft control. The magnetic strip is normally sensitised. When an item is checked-out, the magnetic strip is de-sensitised. When the item is returned, the magnetic strip is re-sensitised. The magnetic detection device triggers an alarm if an attempt is made to pass through a controlled access carrying an article with a sensitised magnetic strip.

As an alternative to bar codes and sensitisable magnetic strips usage of RFID tags is known from the prior art. U.S. Pat. No. 6,693,539 shows an inventory system using articles with RFID tags. Each RFID tag has a unique identification or serial number for identifying the individual article. An inventory database tracks all of the tag articles and maintains circulation status information for each article. Articles are checked out using a self-checkout system.

U.S. Pat. No. 6,169,483 shows a self-checkout/self-check-in RFID and electronics article surveillance system. RFID tags on the articles are read for updating an inventory database.

U.S. Pat. No. 4,583,083 shows a checkout station to reduce retail theft. For theft prevention the retail items have theft prevention indicators for detection of the presence of any such items in the possession of a shopper.

Usage of such electronic prior art systems for the purpose of inventorying items in the possession of employees and for the purpose of employee theft prevention is limited as such electronic systems are not designed for use in a business environment. As a consequence many business organisations lack an efficient and precise inventorying procedure regarding items in the possession of employees.

Usually inventorying of such items is only performed as a part of an employee separation checkout procedure. The employee separation checkout procedure often involves filling out a paper form listing the items returned by the employee. This has the further disadvantage that it places the burden of keeping track of the items provided from the employer to its employee on the employee himself or herself. The same problem occurs when a business organisation moves to another location as this requires that inventorying is performed.

SUMMARY OF THE INVENTION

In accordance with the present invention a server computer is provided that has means for generating user specific web pages for a plurality of users. Each user has a user identifier. For example, an employee number can be used as such a user identifier. Each web page has a user specific set of data fields, such as for showing the items that are supposed to be in the possession of the respective user.

Data source identifiers of data sources that can provide user specific data values for the data fields are stored in order to access the data sources in response to receipt of one of the user identifiers. The respective set of data sources provides the data values for the data fields of the user specific web page.

Various data sources can be used for providing the data values. For example, a relational database, such as SAP R/3 can be used as a data source. A pre-defined database query is assigned to the data source identifier for retrieval of the data value of interest. As an alternative or in addition one or more web services can be used as data sources. The uniform resource locators (URLs) of the web services are used as data source identifiers in order to obtain the required data values using a request-response protocol such as HTTP or HTTPS. Alternatively or in addition various other data sources can be used, such as spreadsheets or the like.

In accordance with a further preferred embodiment of the invention each data source has an assigned link or email address. By means of the link or email address a user can send a message requesting a modification of one or more of the data values or other services such as replacement of a lost or stolen item.

The present invention is particularly advantageous as it provides an efficient means for keeping track of the items in the possession of an employee. This is particularly useful when the information regarding the items in the possession of the employee are spread over various data sources. Another advantage of the present invention is that the employee is released from the task of having to keep track of the items provided to him or her from, the employer. And employee can access the server computer which provides an employee specific web page showing all items that are supposed to be in the possession of the employee. If one of the items needs to be replaced, is lost or stolen, the employee can enter a corresponding message or request which is sent to the respective organisational entity of the company.

In accordance with a preferred embodiment of the invention the employee does not need to manually enter his or her employee number. The employee number is stored on an integrated circuit chip card and is automatically entered into the employee's client computer using an integrated circuit chip card reader.

In accordance with a further preferred embodiment of the invention a copy of the data values provided by the data sources is stored on the chip card. This facilitates usage of the present invention for the purpose of access control to an access controlled area.

In accordance with a further preferred embodiment of the invention the accessed controlled area has a checkpoint with a computer that is coupled to a card reader for reading the data values from the chip card. An employee that requests to enter into or exit from the access controlled area and who carries an item, such as a laptop computer or a mobile telephone, needs to present the item or items at a reception desk for comparison with the data values. If the identifier of an item matches the respective data value read from the chip card, the employee is allowed to carry the item with him or her, from or to the access controlled area. This is useful not only for the purpose of employee theft prevention but also for controlling the circulation of potentially hazardous materials or substances.

In accordance with a further preferred embodiment of the invention the comparison of the item identifier and the respective data value read from the chip card is done automatically. For this purpose the computer that is located at the checkpoint is coupled to a bar code reader for reading a bar code that is attached to the item. The bar code stores the identifier of the item that is compared with the respective data value read from the chip card by the computer. When the identifiers and the respective data values match the computer outputs a door release signal in order to open an automatic door for entry or exit from or to the access controlled area.

BRIEF DESCRIPTION OF THE DRAWINGS

In the following preferred embodiments of the invention will be described in greater detail by way of example only by making reference to the drawings in which:

FIG. 2 shows a user specific web page that is generated by the portal server of the data processing system of FIG. 1, FIG. 3 shows another example for a user specific web page.

DETAILED DESCRIPTION

Figure 1:
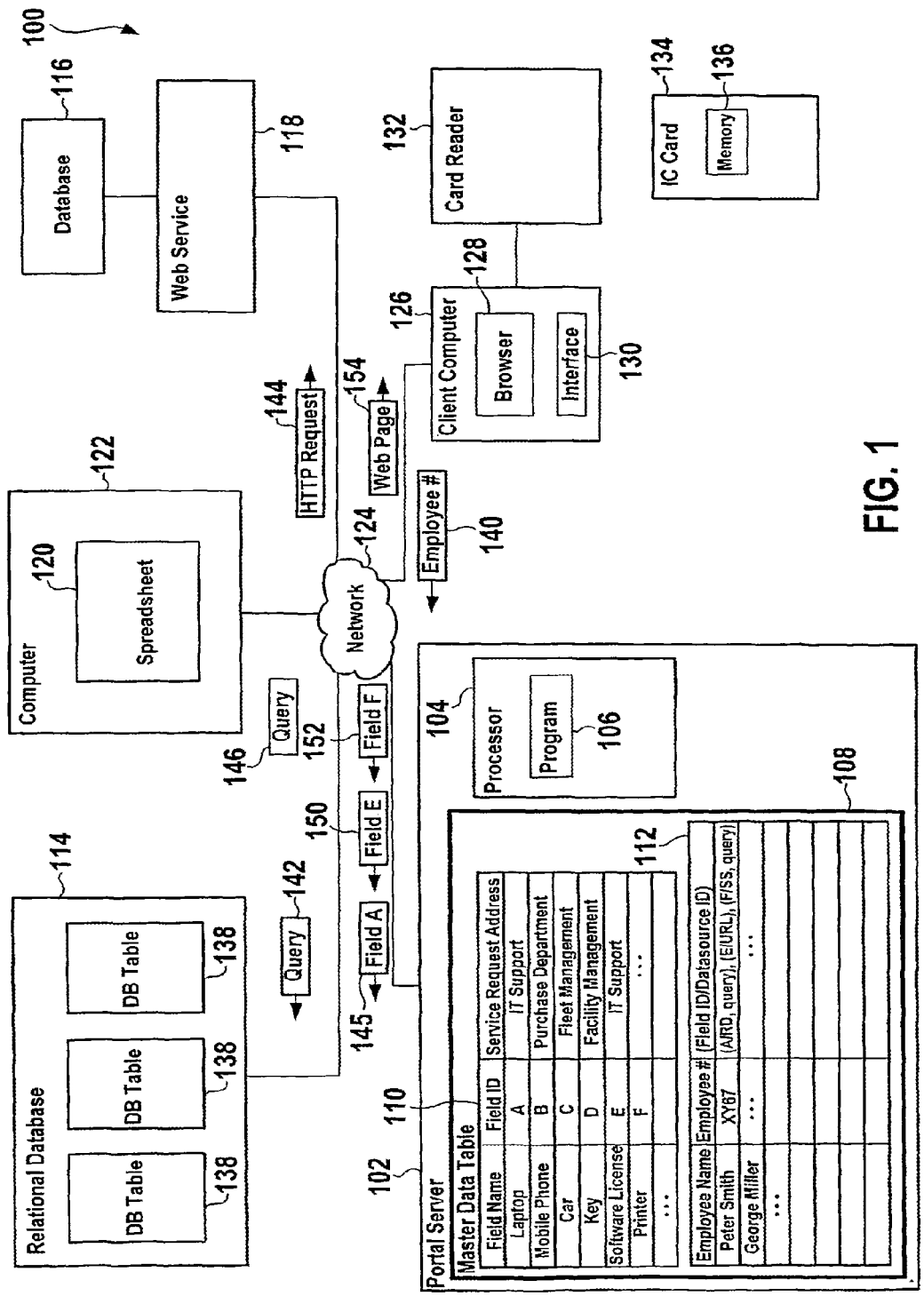
FIG. 1 is a block diagram of a preferred embodiment of a data processing system of the invention.

FIG. 1 shows data processing system 100 that has portal server 102. Portal server 102 has processor 104 for execution of computer program 106. Computer program 106 serves for generating a user specific web page in response to receipt of a respective request carrying a user identifier. Portal server 102 has storage 108 for storing master data table 110 and personalisation table 112. The master data table 110 serves for storage of all fieldnames and field identifiers (IDs) of data fields that can occur in a web page generated by computer program 106.

When data processing system 110 is used for tracking and inventorying of items in the possession of employees there is a fieldname and respective field ID for each item or class of items that can be in the possession of one or more of the employees. In the example considered here such items include a laptop computer such that master data table 110 has a respective fieldname 'laptop' with field ID 'A'. Likewise they are fieldnames and respective field IDs for 'mobile phone', 'car', 'key', 'software licence', 'printer', . . . .

In addition master data table 110 indicates a service request address for each data field. The service request address is a link or email address that can be used for contacting an organisational entity of the company that is responsible for the respective item. For example, for the data fields 'laptop' and 'software licence' the respective service request address in an URL or email address of the company's internal or external information technology (IT) support. For 'mobile phone' a link or an email address of the company's purchase department is given; for 'car' a link or email address of the company's fleet management that manages purchase and maintenance of the company's cars is given; for 'key' a link or email address to the company's facility management is given in master data table 110.

Personalisation table 112 has an entry for each registered employee. For example employee 'Peter Smith' has employee number 'XY67'. The employee number is used as a user identifier for the purpose of data processing system 100 in the embodiment considered here. It is to be noted that other unique identifiers can be used instead of, or in addition, to the employee number.

Further, personalisation table 112 lists the field IDs of fieldnames corresponding to items that are supposed to be in the possession of the respective employee. Each field ID has an assigned data source identifier that identifies a data source for providing a data value for the respective field. In the example considered here employee 'Peter Smith' has a laptop computer, a software licence for his home office computer and a printer for his laptop computer amongst other items. Information regarding Peter Smith's laptop computer is stored in relational database (RD) 114. The field ID 'A' given in personalisation table 112 for employee 'Peter Smith' has assigned the corresponding data source identifier RD that identifies relational database 114 as a data source for information regarding the laptop computer that is supposed to be in the possession of employee Peter Smith. In addition the data source identifier has an assigned pre-defined query for querying relational database 114 in order to provide the respective information regarding the laptop computer.

Information regarding Peter Smith's software licence is stored in database 116 that is accessible through web service 118. The data source provided by web service 118 is identified by a uniform resource locator (URL) of the web service. This URL is assigned to the field ID 'E' that is entered in personalisation table 112 for employee Peter Smith.

Information regarding the printer that is supposed to be in the possession of Peter Smith is stored in spreadsheet (SS) 120 stored on computer 122. A corresponding data source identifier SS is assigned to field ID 'F' that is entered in personalisation table 112 for employee Peter Smith. Employee 'George Miller' may have other items in his possession. This is reflected by corresponding entries in the Field ID/Data source ID column of personalisation table 112 for employee 'George Miller'. The same applies analogously for all other employees that are registered. The data stored in personalization table 112 can be entered and modified only by authorized personnel of the company.

Relational database 114, computer 122 and web service 118 are coupled to portal server 102 by means of network 124. For example, network 124 is a computer network, such as the Internet, an intranet or an extranet. The client computers of the employees of the company that runs data processing system 100 are also coupled to network 124. FIG. 1 shows one of these client computers 126 by way of example.

Client computer 126 has browser program 128, such as Microsoft Internet Explorer or Netscape Navigator. Further, client computer 126 has interface 130 for communication with integrated chip card reader 132. Card reader 132 serves to receive integrated chip card 134 that has non-volatile memory 136.

Relational database 114 has a number of relational database tables 138 for storing of various company data such as human resources data, financial data, logistic data and/or other data. Preferably SAP R/3 is used for implementation of relational database 114.

In the following usage of data processing system 100 by employee Peter Smith is considered by way of example. The employee Peter Smith inserts his employee chip card 134 into card reader 132. The employee chip card 134 is personalised and stores Peter Smith's employee number 'XY67' in its non-volatile memory 136. The employee Peter Smith starts browser program 128 on his client computer 126 and selects the URL of portal server 102. In response Peter Smith is prompted to enter his employee number. Preferably the entry of his employee number is performed automatically by the client computer 126 by reading the employee number from the non-volatile memory 136 via the card reader 132 by means of interface 130.

The employee number is sent as HTTP request 140 from client computer 126 to portal server 102 and is received by computer program 106. Computer program 106 uses the employee number received by means of HTTP request 140 as a key for reading the respective entries for employee Peter Smith from personalisation table 112. Computer program 106 reads the entries from the column Field ID/Data source ID for accessing the identified data sources.

In particular, the computer program 106 sends database query 142 to relational database 114 corresponding to the (A/RD, query) entry for Peter Smith in personalisation table 112. Likewise computer program 106 sends HTTP request 144 to web service 118 using the URL assigned to field ID 'E' in the respective entry of personalisation table 112. Likewise computer program 106 sends query 146 to spreadsheet 120 in accordance with the (F/SS, query) entry.

In response computer program 106 receives the data values 148, 150 and 152 for data fields A, E and F from relational database 114, web service 118 and spreadsheet 120, respectively. These data values, master data table 110 and personalisation table 112 provide the data that is used by computer program 106 to generate a web page that is specific for Peter Smith and that shows the items that are supposed to be in the possession of Peter Smith and details describing such items. The web page 154 is received by client computer 126 and is displayed by browser program 128.

FIG. 2 shows a schematic example for the layout of web page 154. Web page 154 presents the information regarding items that are supposed to the in the possession of Peter Smith in tabular form by giving 'item name', 'item value', 'item location' and 'item ID' for each such item. In addition the respective service request address is given for each item. This facilitates a user's entry of a respective request or notification, for example to report a loss of one of the items, or to request a service such as changing the winter tyres of his company car against summer tires.

Figure 3:
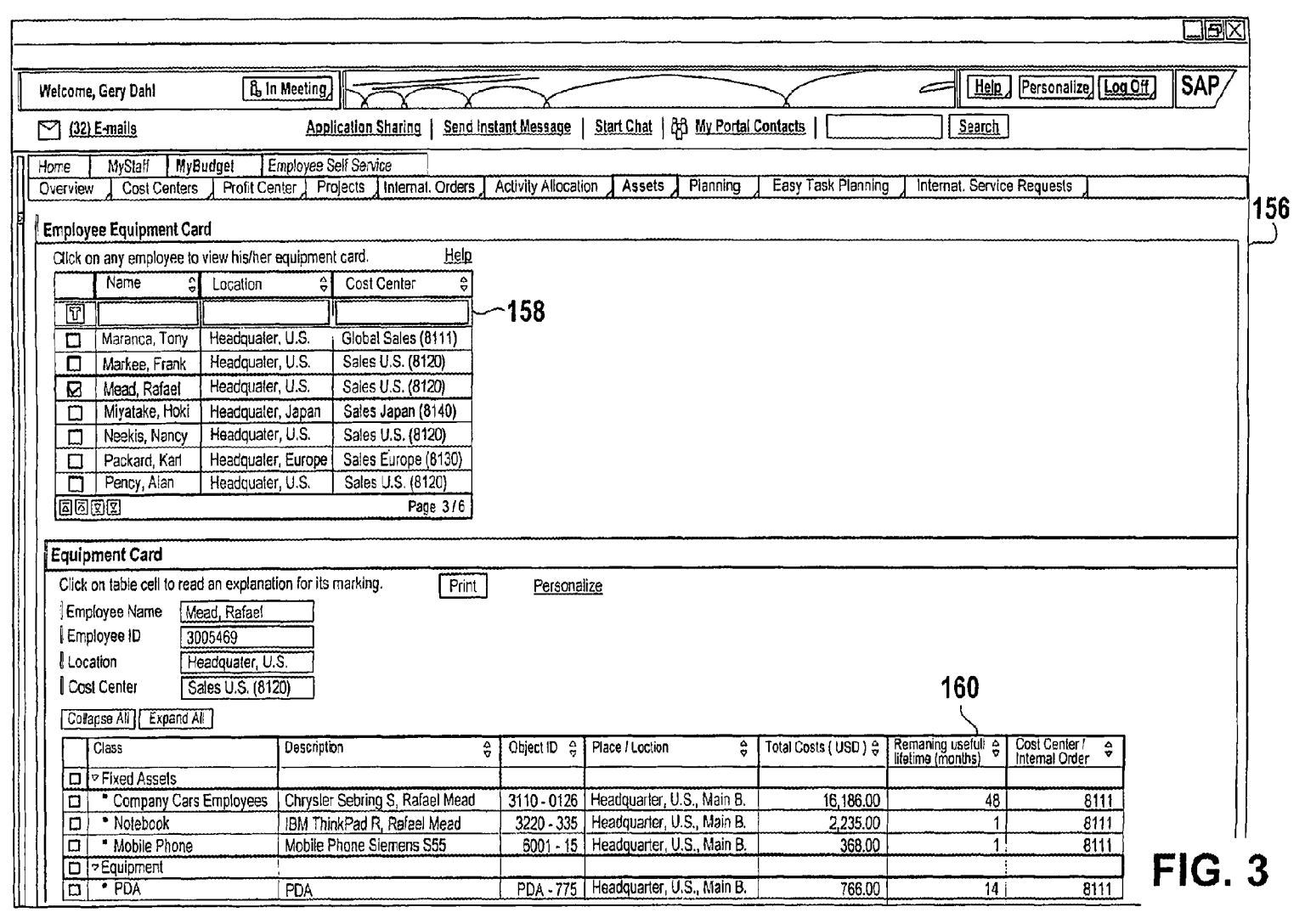

The information contained in web page 154 can also be accessed by the employee's supervisor. FIG. 3 shows a corresponding example for a respective web page 156. For example, George Miller is the supervisor of Peter Smith.

When George Miller uses his client computer to access portal server 102 he enters his employee number either manually or automatically using his chip card. Portal server 102 queries relational database 114 in order to determine George Miller's role. As George Miller is a supervisor the respective database query also returns the employees that are managed by George Miller. George Miller he has the option to either generate a web page of the type as shown in FIG. 2 for his own purposes or to generate the web page 156 for viewing the respective information concerning the employees under his span of control as he has role "supervisor".

If George Miller chooses the latter option web page 156 is generated and displayed by the browser of George Miller's client computer. Web page 156 has table 158 that shows the employees that are managed by George Miller. In addition the table 158 shows the location and the cost centre of the respective employees.

George Miller can select one of the employees shown in table 158 by using the respective check boxes. In the example considered here employee 'Meads,Raphael' is selected. Table 160 of web page 156 shows the respective details of items that are supposed to be in the possession of this employee.

The items are categorised in 'fixed assets' and 'equipment'. Each item has a short description, an object ID, an indication of its place or location, the total of the respective costs in US dollars, the remaining useful lifetime in months, and the cost centre or internal order.

Figure 4:
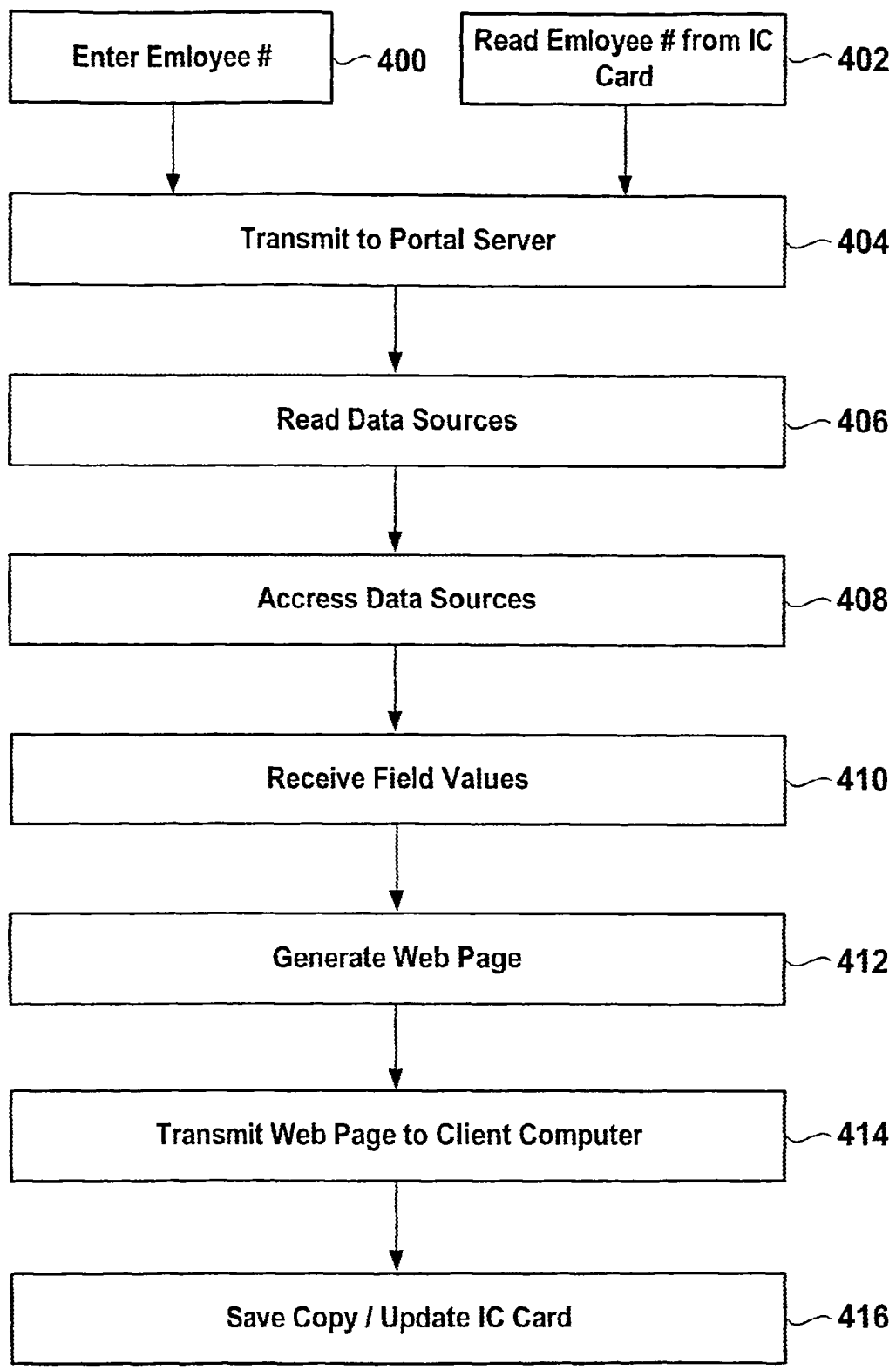
FIG. 4 is a flowchart illustrating a preferred embodiment of the method of the invention.

FIG. 4 shows a flowchart illustrating a preferred mode of operation of the data processing system of FIG. 1. In step 400 an employee enters his or her employee number into one of the client computer systems. As an alternative to the manual input operation the employee inserts his or her chip card into a card reader coupled to the client computer such that the employee number stored on the card is read and entered into the client computer automatically. In step 404 the employee number is transmitted to the portal server by means of a HTTP request. In response to the HTTP request with the employee number the portal server performs access operations to the data sources as identified by the data source identifiers in the personalisation table (cf. personalisation table 112 of FIG. 1).

In step 410 the portal server receives the field values as requested from the data sources and generates a user specific web page using these data values in step 412. The web page is transmitted and displayed on the client computer in step 414 for the employee's information and review. In addition a copy of the field IDs and their assigned field values is stored on the chip card (step 416). Alternatively the field IDs and assigned field values are updated if the procedure has been performed previously.

Figure 5:
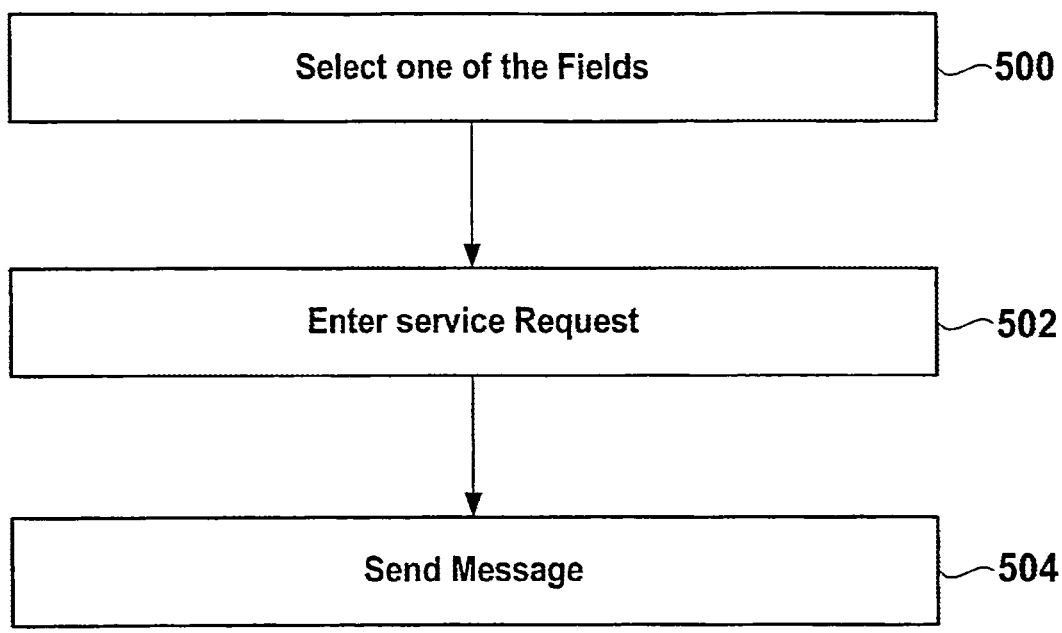
FIG. 5 is a flowchart illustrating entering a service request.

FIG. 5 illustrates how the employee can utilise the user specific web page for requesting service. In step 500 the employee selects one of the data fields shown in the web page. For example, this can be done by double clicking on the selected data field, which opens a dialogue window for entering a service request (step 502). In step 504 a message with the service request entered in step 502 is sent to the organisational entity as identified by the service request address assigned to the selected data field.

Figure 6:
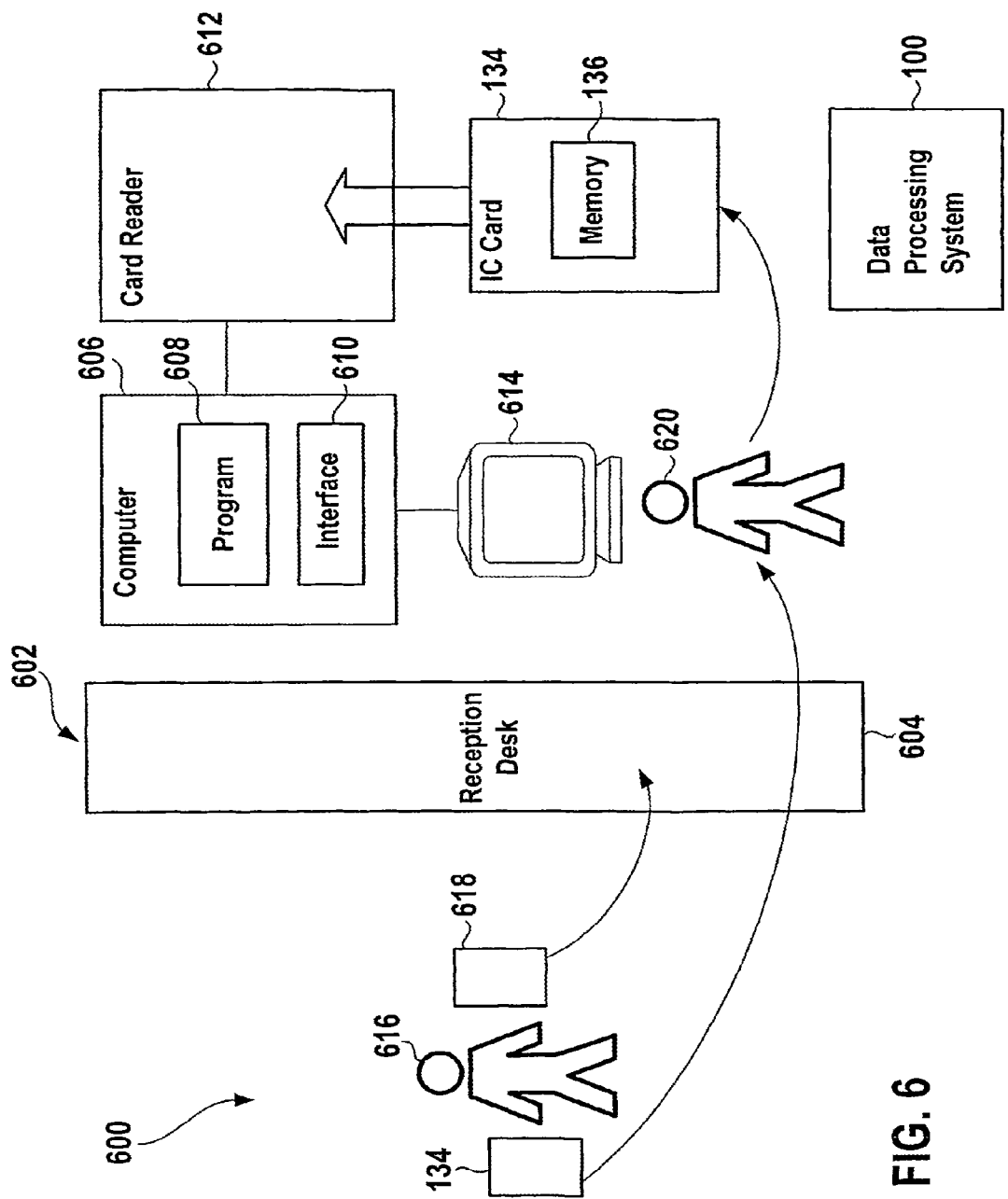
FIG. 6 is a block diagram of a preferred embodiment of an access control system of the invention that uses the data processing system of FIG. 1.

FIG. 6 shows an access control system 600 for controlling access to an access controlled area such as the premises of the company. The access control system 600 uses the data processing system 100 as shown in FIG. 1 for implementing access control. The chip card 134 stores a copy of the field IDs and assigned field values of the employee whose employee number is also stored in the non-volatile memory 136 of the chip card 134. (cf. step 416 of FIG. 4).

Access control system 600 has at least one checkpoint 602 for controlled entry or exit into or out of the controlled area. The checkpoint 602 has reception desk 604 and a computer 606 for running computer program 608. The computer 606 has interface 610 for communicating with chip card 134 via card reader 612. Further, monitor 614 is coupled to computer 606.

In operation employee 616 requests entry or exit from the access controlled area by presenting himself or herself at reception desk 604. The employee 616 carries chip card 134 and at least one item 618. The employee 616 gives his chip card 134 to security guard 620 who inserts the chip card 134 into card reader 612. This invokes program 608 which reads the data stored in the memory 136 via card reader 612 by means of interface 610 and displays the data on monitor 614.

Security guard 620 checks whether the item 618 is listed among the items shown on monitor 614 that are authorised to be in the possession of employee 616. For example item 618 has an object ID that is printed on a label. The same object ID needs to appear on monitor 614. If this is the case the employee 616 is allowed entry or access into or from the access controlled area with the item 618.

This is useful for theft prevention of valuable equipment, such as laptop computers and the like. Another preferred application is the control of the circulation of potentially hazardous material, substances or equipment.

Figure 7:
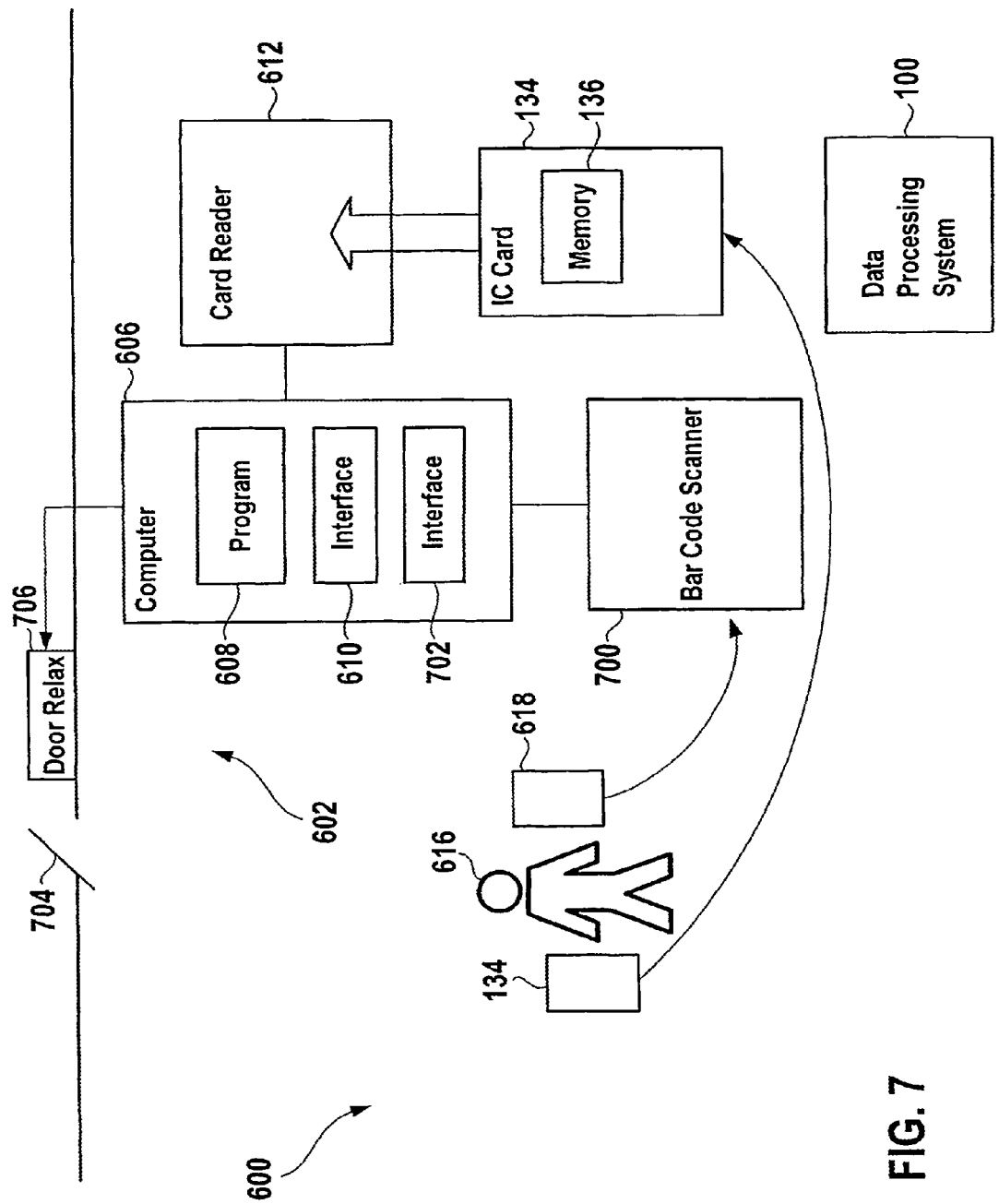
FIG. 7 is a preferred embodiment of the access control system using a bar code scanner and an automatic door.

FIG. 7 shows an alternative embodiment of the access control system 600. Elements of FIG. 7 that correspond to elements of FIG. 6 are designated by the same reference numerals.

In the embodiment of FIG. 7 bar code scanner 700 is coupled to computer 606 that has interface 702 for receiving bar code information from bar code scanner 700.

Checkpoint 602 has automatic door 704 that provides an entry and/or exit point to and/or from the access controlled area. The door 704 has an automatic door release device 706 that is controlled by computer 606.

In operation the employee 616 inserts his or her chip card 134 into card reader 612 and places item 618 on bar code scanner 700. The program 608 compares the object ID read from the bar code of item 618 by bar code scanner 700 and the respective object ID read from the memory 136 of the chip card 134. If the scanned-in object ID and the respective data value stored on the chip card 134 match, computer 606 outputs a door release signal for door release device 706 in order to open the automatic door 704.

LIST OF REFERENCE NUMERALS 100 data processing system
102 portal server
104 processor
106 computer program
108 storage
110 master data table
112 personalisation table
114 relational database
116 database
118 web service
120 spreadsheet
122 computer
124 network
126 client computer
128 browser program
130 interface
132 card reader
134 chip card
136 memory
138 database table
140 HTTP request
142 query
144 HTTP request
146 query
148 data values
150 data values
152 data values
154 web page
156 web page
158 table
160 table
600 access control system
602 checkpoint
604 reception desk
606 computer
608 program
610 interface
612 card reader
614 monitor
616 employee
618 item
620 security guard
700 bar code scanner
702 interface
704 door
706 door release device

The invention claimed is:

1. A computer system for generating user-specific web pages for a plurality of users, the computer system comprising:
a storage device that stores a set of instructions; and
at least one processor that is configured, by execution of the set of instructions, to perform the following operations:
receive a user identifier from a client computer;
determine a supervisory role associated with the user identifier;
retrieve, from the storage device, supervisor-specific data including:
at least one supervised user associated with the supervisory role,
at least one item in possession of the supervised user, and
respective costs of each of the at least one item in possession of the supervised user; and
generate a supervisory role web page including:
a first table listing at least one supervised user associated with the supervisory role; and
for a selected supervised user, a second table listing the at least one item in possession supervised user, a description of the at least one item, and a location of the at least one item.

2. The computer system of claim 1, wherein the supervisor-specific data includes a remaining lifetime of the at least one item, and the second table lists the remaining lifetime of the at least one item.

3. A computer-implemented method for generating user-specific web pages for a plurality of users, the method comprising:
receiving a user identifier from a client computer;
determining a supervisory role associated with the user identifier;
retrieving, by at least one processor, supervisor-specific data reflecting:
at least one supervised user associated with the supervisory role,
at least one item in possession of the supervised user, and respective costs of each of the at least one item in possession of the supervised user; and generating, by the at least one processor, a supervisory role web page including:

a first table listing at least one supervised user associated with the supervisory role; and for a selected supervised user, a second table listing the at least one item in possession of the supervised user, a description of the at least one item, and a location of the at least one item.

4. The method of claim 3, wherein the supervisor-specific data includes a remaining lifetime of the at least one item, and the second table lists the remaining lifetime of the at least one item.

5. A computer program product comprising a non-transitory computer-readable storage medium, the non-transitory computer-readable storage medium storing a set of instructions, that when executed by a processor, cause the processor to:

receive a user identifier from a client computer;

determine a supervisory role associated with the user identifier;

retrieve supervisor-specific data reflecting:

at least one supervised user associated with the supervisory role, at least one item in possession of the supervised user, and respective costs of each of the at least one item in possession of the supervised user; and generate a supervisory role web page including:

a first table listing one supervised user associated with the supervisory role; and for a selected supervised user, a second table listing the at least one item in possession of the supervised user, a description of the at least one item, and a location of the at least one item.

6. The computer program product of claim 5, wherein the supervisor-specific data includes a remaining lifetime of the at least one item, and the second table lists the remaining lifetime of the at least one item.

* * * * *